United States Patent Office 3,758,425
Patented Sept. 11, 1973

3,758,425
PROCESS FOR THE PREPARATION OF FOAM-ABLE STYRENE POLYMERS
Horst Jastrow, Niederhochstadt, Michael Lederer, Falkenstein, Taunus, and Elmar Heiskel, Langen, Germany, assignors to Farbwerke Hoechst Aktiengesellschaft vormals Meister Lucius & Bruning, Frankfurt am Main, Germany
No Drawing. Filed Nov. 15, 1971, Ser. No. 198,943
Claims priority, application Germany, Nov. 16, 1970, P 20 56 217.8
Int. Cl. C08f 47/10; C08j 1/26
U.S. Cl. 260—2.5 B    6 Claims

ABSTRACT OF THE DISCLOSURE

A process for preparing foamable styrene polymer beads containing blowing agents with a particularly favourable, narrow grain size distribution. This novel process comprises the use of copolymers of N-vinyl-N-alkyl acetamide having from 1 to 4 carbon atoms in the alkyl group with an ester of acrylic, methacrylic, maleic or fumaric acid with an aliphatic alcohol having a linear or branched chain and containing from 6 to 18 carbon atoms, as protective colloid in the homo- or copolymerization of styrene in an aqueous suspension in the presence of a blowing agent.

---

The present invention relates to a process for the preparation of foamable styrene polymers.

The polymerization of styrene in the presence of blowing agents in order to give foamable polystyrene is effected in an aqueous suspension. Particularly suitable from the technical point of view is a bead polymer containing blowing agents, which polymer is obtained with a narrow grain size distribution, the diameter of the grains being in the range of from 0.3 to 1.2 mm.

It has ben proposed in German Auslegeschrift No. 1,273,199 to polymerize styrene in the presence of from 0.1 to 1% of a water-soluble organic protective colloid, such as gelatine, starch, poly-N-vinyl pyrrolidone, polyvinyl alcohol, oxethyl cellulose or carboxymethyl cellulose, in which process the total or the principal amount of the protective colloid is added before the rate of polymerization has been reached at which the polymer particles which have flowed together no longer separate (Japanese Pat. No. 20 456/68, German Auslegeschrift No. 1,150,527, British Pat. No. 1,094,315). The moment which is suitable for the addition has to be determined by way of sampling during polymerization.

Furthermore, German Auslegeschrift No. 1,150,527 proposes to prepare bead polymers having a narrow grain size distribution and containing blowing agents by way of suspension polymerization of styrene in the presence of sulfonated vinyl aromatic polymers containing from 0.5 to 1 sulfonic acid group per monomer unit. In this process use is made of 1.5%, calculated on water, or >2%, calculated on styrene, of resin sulfonates with good swelling properties which are, however, difficult to prepare.

It has also been proposed to obtain a narrow grain size distribution in the suspension polymerization by using a combination of suspension auxiliary agents consisting of about 0.4% (calculated on the monomer) of water-soluble cellulose derivatives and a small amount of N-vinyl-pyrrolidone-acrylic acid copolymers. However, this mixed system is only applicable in the range of a large phase ratio of styrene to water <1.

It is more advantageous, however, to use a uniform system instead of a mixture.

Furthermore, German Offenlegungsschrift No. 1,595,-478 describes the adjustment of the grain size distribution by using the combination of from 0.2 to 1% of tricalcium phosphate (TCP) and from 0.01 to 2% of wetting agent. This process is particularly disadvantageous owing to the preparation of a thioxotropic TCP paste of a determined consistency prior to polymerization, and also because of the fact that a considerable amount of surface-active substances has to be added. In this process the waste water problem is particularly critical.

Belgian Pat. No. 641,634 describes the use of poly-N-vinyl-methyl acetamide in a large phase ratio for the suspension polymerization of styrene. In the polymerization with a small phase ratio, i.e. styrene/water >1 (weight ratio), difficulties are caused by the formation of a coating.

The use of copolymers of N-vinyl-N-methyl acetamide with from 1 to 9% of octyl acrylate having a low K value resulted in lentil- or rice-shaped polymers and/or a strong wall coating.

It has now been found that the polymerization of styrene or of mixtures of styrene with up to 10% by weight of its alkyl derivatives or its derivatives having been halogenated in the nucleus, optionally in admixture with up to 10% by weight, calculated on the total amount of monomers, of esters of acrylic or methacrylic acid with aliphatic alcohols, acrylonitrile, vinyl chloride, vinyl esters of aliphatic carboxylic acids, and vinyl polysiloxanes in an aqueous suspension, with the aid of common initiators and with the addition of a blowing agent and a protective colloid, leads to a particularly favourable grain size distribution, if as protective colloid there is used a copolymer of from 98 to 99.5% by weight of N-vinyl-N-alkyl acetamide having from 1 to 4 carbon atoms in the alkyl group, preferably N-vinyl-N-methyl acetamide, and from 2 to 0.5% by weight of an ester of acrylic, methacrylic, maleic or fumaric acid with an aliphatic alcohol having a linear or branched chain and containing from 6 to 18 carbon atoms, preferably 2-ethylhexyl-acrylate, with a K value according to Fickentscher, measured with a 1% solution in methanol at 20° C., of from 70 to 120, preferably from 80 to 100, in an amount of from 0.02 to 0.08% by weight, preferably from 0.03 to 0.05% by weight, calculated on the monomer and/or the monomer mixture.

By means of varying the amount of protective colloid, it is possible to adjust the range of the particle size within 300 and 2,500μ, without a considerable proportion of technically useless fractions having a particle size of more than 2,500μ and less than 300μ being formed.

Particularly suitable are copolymers having a K value according to Fickentscher of from 70 to 120, preferably from 80 to 100, measured with a 1% solution in methanol at 20° C.; it is also possible to use copolymers having a higher molecular weight, however, this does usually not have any special advantages.

The preparation of the copolymers used in accordance wtih the invention of from 98 to 99.5% by weight of N-vinyl N-alkyl acetamide and from 2 to 0.5% by weight of alkyl acrylate, methacrylate, maleinate or fumarate is effected preferably according to the process described in German Pat. No. 1,246,248.

Suitable comonomers of N-vinyl-N-alkyl acetamide, besides 2-ethyl-hexyl-acrylate to be used preferably, are, for example, n-hexyl-acrylate, decyl-methacrylate, dodecyl-maleinate, and stearyl fumarate.

It is recommended to carry out the suspension polymerization while using from 0.02 to 0.08% by weight, calculated on the monomer or the monomer mixture, of dispersion agent according to the invention, preferably from 0.03 to 0.05% by weight. A higher concentration of the dispersion agent is not necessary for the reproducible adjustment of a narrow grain size range of between 300μ and 2,500μ. It is indeed the use of a very small amount of dispersion agent according to the invention, which enables a better economy of the process of the invention, in particular with regard to waste water problems. Besides, it is very advantageous that the grain size range can be adjusted by specific dosage of the dispersion agent at given stirring conditions, so that operations such as sampling do not have to be carried out during polymerization.

The suspension polymerization is advantageously carried out in a phase ratio of monomers to water $>1$ (weight ratio); less economical phase ratios $<1$ can naturally also be achieved in the polymerization by means of this system. Salts may be dissolved in the aqueous phase, or organic liquids which are miscible with water can be added to it.

The monomers to be used in the polymerization are styrene in an amount of at least 90% by weight and optionally up to 10% by weight of acrylic esters and/or methacrylic esters of aliphatic linear or branched alcohols, preferably those having from 1 to 8 carbon atoms, acrylonitrile, vinyl esters of aliphatic linear or branched carboxylic acids, preferably those having from 1 to 12 carbon atoms, vinyl chloride and vinyl polysiloxanes. Up to 10% by weight of the styrene may be replaced by substituted styrenes such as alkylated styrenes, for example, α-methyl styrene, tert. butyl styrene, or styrenes which are halogenated in the nucleus, for example, bromo-styrene. As acrylic esters that can be copolymerized with styrene there are suitable, for example, ethyl acrylate, hexyl methacrylate, methyl methacrylate, 2-ethyl-hexyl acrylate.

As vinyl esters there may be used, for example: vinyl formate, vinyl acetate, vinyl propionate, vinyl hexoate, or commercial mixtures of branched carboxylic acids. As vinyl polysiloxanes there may be used those, which are prepared by means of cohydrolysis of compounds of formula $Cl_2Si(R)(CH=CH_2)$ with compounds of formula $(Cl_2Si(R)_2$, for example, $Cl_2Si(CH_3)(CH=CH_2)$ with $Cl_2Si(CH_3)_2$, and which contain units of formulae

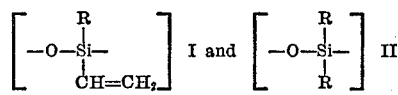

and hydroxyl terminal groups, in which R stands for identical or different alkyl groups having from 1 to 4 carbon atoms, and the ratio of I to II is from 1:4 to 1:50. The molar weight of these polysiloxanes is in the range of from about 1,000 to about 5,000.

The conditions of the suspension polymerization are the common ones: In a pressure vesel provided with stirrer, a mixture of water and the monomer or monomer mixture is brought to an elevated temperature, together with the dispersion agent, and an initiator or an initiator mixture is added.

As initiators there are used, for example, dibenzoyl peroxide, azodi-isobutyro-nitrile, and tert.-butyl peracetate in an amount of from 0.1 to 0.5% by weight, calculated on the monomer or the monomer mixture. The polymerization may be started in the presence of from 4 to 12% by weight of a blowing agent which may, however, be added also when the polymerization is already running, preferably at a polymerization rate of from 50 to 55%. As blowing agents there may be used those common for polystyrene polymers, such as hydrocarbons, for example, n-pentane, isopentane, cyclopentane, hexane, and petroleum ether fractions, or halogen hydrocarbons, such as $CFCl_3$, $CF_2Cl_2$, $CH_3Cl$, $CH_2Cl_2$, separately, or in admixture with one another. The polymerization temperatures are in the range of from 40 to 125° C., with pressures rising up to 16 atmospheres gage.

Together with the monomer mixture, or together with the propellant, a very small amount ($<<1$% by weight) of nucleating agent may also be added for pore regulation. For this purpose, use is made of the common bromine compounds, such as hexa-bromo-cyclo-dodecane, tetrabromo-butane, tris-(dibromo-propyl-phosphate), as well as brominated oligomers of butadiene and chlorine compounds, such as chloroparaffins, polyvinyl chloride and post-chlorinated PVC, as well as polysiloxanes and/or vinyl polysiloxanes, for example those having the constitution indicated above, with regard to the monomers.

Moreover, the suspension polymerization of the invention can be used for the preparation of flame-proof styrene polymers. In this process, from 0.1 to 3% by weight, calculated on the polymer, of one or several halogen compounds, as well as a small amount of a synergist, are added to the monomer or the monomer mixture, prior to the common suspension polymerization.

Common halogen compounds used for obtaining flame-proofness are, for example, hexabromo-cyclo-dodecane, tetrabromobutane, tris - (dibromo - propyl - phosphate) and polybromo-styrene. Further additions of $<1$% by weight, calculated on the polymer, may consist of a common synergist in order to improve the flame-proofness, for example, peroxides, such as dicumyl peroxide, di-tert.-butyl-peroxide, or of indigoid substances or radical-yielding substances, such as tetraphenyl-dimethyl-ethane.

Besides, plasticizers, auxiliaries improving the fluidity, optical brighteners, or dyestuffs may be added to the monomers.

The following examples serve to illustrate the invention.

EXAMPLES

In an enameled vessel, 71 parts by volume of water and 83 parts by volume of styrene were heated at 90° C. under a nitrogen atmosphere, while stirring, together with the amount indicated in the following tables of a copolymer of N-vinyl-N-methyl-acetamide and 1% by weight of 2-ethyl-hexyl acrylate (calculated on the amount of styrene), having a K value of 80 according to Fickentscher, and the reaction mixture was initiated by a mixture consisting of 0.27% by weight of dibenzoyl peroxide and 0.11% by weight of tert.-butyl-perbenzoate (each calculated on the amount of styrene); after 9 hours the internal temperature was maintained at 115° C. for 4 hours, and subsequently the polymer was cooled. 0.01% by weight of a vinylpolysiloxane was added to the monomer mixture for the purpose of pore regulation. 5 hours after the initiation, 9 parts by volume of pentane were pressed over a sluice into the closed stirring vessel.

TABLE 1

| Example | Percent by wt. of dispers. agent [1] | R.p.m. | Residue on the sieve in percent—$\phi$ in mm. | | | | | | | | | | | Remarks |
|---|---|---|---|---|---|---|---|---|---|---|---|---|---|---|
| | | | 2.5 | 2.0 | 1.6 | 1.0 | 0.8 | 0.6 | 0.4 | 0.32 | 0.2 | 0.1 | <0.1 | |
| 1 | 0.1 | 150 | | 0.1 | 0.2 | 2.7 | 3.8 | 10.4 | 15.0 | 15.3 | 12.3 | 30.2 | 10.0 | |
| 2 | 0.06 | 150 | 0.2 | 0.4 | 6.1 | 29.2 | 12.8 | 13.3 | 9.2 | 13.4 | 10.9 | 4.5 | | |
| 3 | 0.05 | 130 | 0.2 | 2.7 | 12.6 | 23.4 | 12.6 | 20.2 | 10.3 | 9.7 | 6.3 | 2.2 | | |
| 4 | 0.04 | 130 | 0.8 | 8.5 | 25.8 | 27.2 | 11.8 | 13.3 | 5.4 | 5.0 | 2.0 | 0.2 | | |
| 5 | 0.04 | 130 | 0.5 | 7.5 | 25.2 | 26.5 | 13.9 | 13.8 | 7.0 | 5.1 | 0.3 | 0.2 | | |
| 6 | 0.04 | 130 | 0.5 | 2.2 | 28.5 | 40.8 | 11.0 | 10.6 | 3.9 | 2.2 | 0.3 | | | |
| 7 | 0.04 | 130 | 0.4 | 2.0 | 26.2 | 36.2 | 11.3 | 11.2 | 4.3 | 4.0 | 2.0 | 0.4 | | Fl.-pr. |
| 8 | 0.04 | 130 | 0.2 | 2.5 | 26.2 | 47.9 | 11.3 | 8.4 | 2.1 | 1.0 | 0.3 | 0.1 | | Fl.-pr. |
| 9 | 0.03 | 175 | 1.3 | 15.2 | 32.7 | 49.9 | 6.6 | 1.1 | 0.1 | 0.1 | | | | |

[1] Calculated on styrene.

NOTE.—Fl.-pr.=with the addition of 600 g. of hexabromo-cyclododecane and 375 g. of di-tert.-butyl peroxide for the preparation of a flame-proof type. The reproducibility of the grain size adjustment in the range of from 300 to 2,000/μ becomes particularly evident in reaction mixtures 4 to 8.

TABLE 2

| Example | Percent by wt. of dispers. agent [1] | Percent by wt. of com.[2] | K value | R.p.m. | 2.5 | 2.0 | 1.6 | 1.0 | 0.8 | 0.6 | 0.5 | 0.4 | 0.32 | 0.2 | 0.1 |
|---|---|---|---|---|---|---|---|---|---|---|---|---|---|---|---|
| 10 | 0.04 | (3) | 85 | 150 | | | | | | | | | | | [4] X |
| 11 | 0.06 | (3) | 86 | 150 | | | | | | | | | | | [4] X |
| 12 | 0.04 | 0.25 | 95 | 150 | | | | | | | | | | | [4] X |
| 13 | 0.04 | 0.5 | 84 | 130 | | 0.3 | 5.0 | 33.7 | 32.5 | 14.7 | 8.7 | 5.0 | 0.1 | | |
| 14 | 0.04 | 2.0 | 87 | 150 | 0.3 | 8.0 | 29.2 | 39.5 | 9.5 | 9.3 | 4.1 | 4.6 | 1.4 | 0.1 | |
| 15 | 0.05 | 4.0 | | 150 | Lentils and coating | | | | | | | | | | |
| 16 | 0.05 | 9.0 | | 150 | Lentils and coating | | | | | | | | | | |

[1] Calculated on styrene.
[2] 2-ethyl-hexyl-acrylate was used as comonomer.
[3] Without.
[4] Phase separation during polymerization.

What is claimed is:

1. In a process for the polymerization of styrene or of mixtures of styrene and up to 10% by weight of its alkyl derivatives or its derivatives having been halogenated in the nucleus, optionally in admixture with up to 10% by weight, calculated on the total amount of monomers, of esters of acrylic or methacrylic acid with aliphatic alcohols, acrylonitrile, vinyl chloride, vinyl esters of aliphatic carboxylic acids, and vinyl polysiloxanes in an aqueous suspension, with the aid of common initiators and with the addition of a blowing agent and a protective colloid, the improvement which comprises adding during the polymerization as protective colloid a copolymer of (a) from 98 to 99.5% by weight of N-vinyl-N-alkyl acetamide having from 1 to 4 carbon atoms in the alkyl groups, and (b) from 2 to 0.5% by weight of an ester of acrylic, methacrylic, maleic or fumaric acid and an aliphatic alcohol having a linear or branched chain and containing from 6 to 18 carbon atoms, having a K value according to Fickentscher, measured with a 1% solution in methanol at 20° C., of from 70 to 120, in an amount of from 0.02 to 0.08% by weight, calculated on the monomer or the monomer mixture.

2. A process as claimed in claim 1, wherein an amount of from 0.03 to 0.05% by weight, calculated on the monomer or the monomer mixture, of the copolymer constituting the protective colloid is used.

3. A process as claimed in claim 1, wherein the copolymer constituting the protective colloid has a K value according to Fickentscher, measured with a 1% solution in methanol at 20° C., of from 80 to 100.

4. A process as claimed in claim 1, wherein the N-vinyl-N-alkyl acetamide in the copolymer used as protective colloid is N-vinyl-N-methyl acetamide.

5. A process as claimed in claim 1, wherein a copolymer of N-vinyl-N-alkyl acetamide with 2-ethyl-hexyl-acrylate is used as protective colloid.

6. A process as claimed in claim 1, wherein a copolymer of N-vinyl-N-methyl acetamide with 2-ethyl-hexyl-acrylate is used as protective colloid.

References Cited

UNITED STATES PATENTS

| | | | |
|---|---|---|---|
| 3,001,954 | 9/1961 | Buchholz et al. | 260—2.5 B |
| 2,888,410 | 5/1959 | Buchholz | 260—2.5 B |
| 2,983,692 | 5/1961 | D'Alelio | 260—2.5 B |

FOREIGN PATENTS

| | | | |
|---|---|---|---|
| 641,634 | 12/1962 | Belgium | 260—93.5 W |

MURRAY TILLMAN, Primary Examiner

M. FOELAK, Assistant Examiner

U.S. Cl. X.R.

260—45.7 R, 45.7 P, 85.5 AM, 85.5 XA, 85.5 ES, 85.5 N, 86.3, 86.7, 87.5 R, 88.1 P, 88.2 C, 93.5 W, 827, 881, 884, 885, 886, 898, 899, 901, DIG. 24